3,200,747
METHOD OF DUPLICATING BALLISTIC DENSITY
Glenn P. Sorenson, Walnut Creek, and Richard G. McKee, Danville, Calif., assignors to MB Associates, a corporation of California
No Drawing. Filed Feb. 8, 1963, Ser. No. 257,088
2 Claims. (Cl. 102—49)

This invention relates in general to the field of ballistic missiles and, more particularly, to a method of creating the appearance on radar detection devices of a high density ballistic missile warhead using in actuality a low density vehicle.

Presently, efforts are being made to decoy from radar detection incoming missiles and warheads whereby the enemy may not effectively deploy counter-measure techniques. Heretofore, a variety of decoy vehicles have been launched from the payload vehicle during the intermediate portion of the missile's flight, that is, during the portion of the vehicle flight when it is traveling in outer space. Under these conditions several decoy vehicles made of fiberglass, wood, or other material coated with a conductor to provide adequate radar stimulus or small metal (steel, tungsten) decoys may be separated from the payload making it impossible to distinguish between these targets by means of radar techniques. However, as the warheads start to re-enter the atmosphere, the lighter decoys will be greatly slowed by the atmospheric drag forces and discrimination between the payload and the decoys will be relatively easy. One method of effectively decoying the payload during re-entry is to employ a decoy warhead which has the same shape and mass as the payload warhead and, consequently, has the same re-entry velocity profile. This has the distinct disadvantage that such a decoy may be so heavy as to be unusable, and at best, only a limited number of decoys may be employed.

The object of the present invention is to provide a method for effectively simulating the ballistic density of warheads, missiles, or other targets during re-entry of these vehicles into the atmosphere whereby radar detection devices are effectively deceived.

The present method employs a light-weight decoy (with suitable exterior configuration to simulate the payload vehicle) in which a rocket motor is disposed. As the decoys and payload come into the atmosphere during re-entry, the decoys will tend to slow down much more rapidly than does the payload. However, if a rocket motor is provided, the decoy warhead may be made to travel as fast as the payload warhead by offsetting the difference in drag forces by rocket thrust.

The thrust requirements for the low ballistic density decoy may be derived from Newton's Second Law. For the high density payload, the forces acting are drag and gravity (neglecting lift). The payload will enter the atmosphere at some angle $\theta$, and the atmospheric density will vary with altitude. The forces acting on the decoy of low ballistic density are gravity, drag and thrust (again neglecting lift). The entry angle $\phi$ may or may not be the same as that of the payload. First, ballistic density may be defined by the following equation:

$$B = \frac{W}{AC_d}$$

where B is the ballistic density, W is the body weight which equals the mass times gravity, A is the frontal area, and $C_d$ is the coefficient of drag. Since the objective is to have the same flight pattern for both bodies, one may equate the forces acting on them respectively; hence, the rocket thrust necessary to drive the decoy at the velocity of the payload warhead is:

$$T = \tfrac{1}{2}\rho V^2 \left[\frac{1}{B_2} - \frac{\sin \theta}{\sin \phi B_1}\right] W$$

where T is the rocket thrust, $\rho$ is the density of the atmosphere, V is the velocity, $B_1$ is the payload ballistic density, $B_2$ is the decoy ballistic density, and W is the weight of the decoy at any time. In most practical situations, $\theta$ will be very nearly equal $\phi$, but the weight and ballistic density $B_2$ of the rocket propelled decoy varies with the time as propellant is consumed and ejected. Thus the weight W is now equal to $W_L - \dot{W}t$, where $W_L$ is the initial weight, $\dot{W}$ is the weight of the propellant consumed per unit time, and $t$ is the time. Hence the equations describing the thrust requirements are as follows:

$$T = \tfrac{1}{2}\rho V^2 \left[\frac{1}{B_{2,t}} - \frac{1}{B_1}\right](W_L - \dot{W}t)$$

and $$B_{2,t} = \frac{W_L - \dot{W}t}{AC_d}$$

Neglecting the effective gravity which is small compared to the drag at the high velocities of interest, the velocity of the body re-entering the atmosphere may be obtained and shown to be $$V = V_E e^{-Z e^{-\beta x}}$$

for $X < X_E$, $$Z = \frac{\rho g \sin \theta}{2 B_1 \beta}$$

E being re-entry conditions, and $\beta$ being the altitude density function. These equations may now be used to evaluate the thrust requirements for various situations where a decoy of lower ballistic density is used to stimulate a warhead of higher ballistic density. It may be seen that the thrust increases by a factor of 10 approximately every 50,000 feet of descent and thus the maximum thrust need only be applied for the last few seconds of burn. Hence, it is feasible to propel a light weight decoy down to less than 200,000 feet at approximately the velocity of an incoming warhead. Thus for any decoy of a known area and coefficient of drag, the necessary weight of propellant may be calculated to push it at the same velocity as the warhead travels. For example, assume a decoy weighing about one-half pound, excluding propellant material, having a frontal area of 0.25 ft.², a coefficient of drag of unity, a re-entry velocity of 23,700 feet/second at 400,000 ft. and an angle of 22.5°, the amount of double base propellant required would be:

| Altitude | Propellant Weight in Pounds | Initial Decoy B |
|---|---|---|
| 300,000 | 0.006 | 2.025 |
| 200,000 | 0.324 | 3.29 |
| 150,000 | 2.85 | 13.4 |
| 100,000 | 30.6 | 124.2 |

As this illustrates, almost any ballistic density may be simulated by using a lighter decoy in conjunction with a rocket propulsion unit. The great advantage of such a system is that relatively large numbers of light weight decoys may be ejected and travel parallel to the incoming payload vehicle. These decoys as seen through radar detection devices would have exactly the same ballistic density as the payload vehicle making discrimination between the vehicles on the basis of velocity and acceleration impossible. If so many decoy targets are presented and at suitable spacing from each other, such that a single weapon could not destroy all of them, the probability of destruction of the payload vehicle would be greatly reduced.

We claim:

1. The method of duplicating the velocity and acceleration of a body of high ballistic density during re-entry into the earth's atmosphere comprising the steps of deploying a body of high ballistic density and a low ballistic density decoy in outer space and deploying said decoy in the same direction as said body and firing a rocket motor disposed in said decoy when said decoy begins to re-enter the atmosphere, whereby rocket thrust compensates for aerodynamic drag and said decoy has the same acceleration, velocity and direction of said body of high ballistic density.

2. The method of deceiving a radar by duplicating the velocity and acceleration of a body of high ballistic density during re-entry into the earth's atmosphere comprising the steps of deploying a high ballistic density body and a low ballistic density decoy in outer space in the same direction and deploying said decoy from said body to move a suitable distance away from said body and in the same forward direction as said body and firing a rocket disposed in said decoy during re-entry of said decoy into the earth's atmosphere, whereby said decoy has the same velocity, direction and acceleration as said body of high ballistic density.

References Cited by the Examiner

UNITED STATES PATENTS

| | | | |
|---|---|---|---|
| 2,957,417 | 10/60 | Musgrave | 102—50 |
| 3,020,542 | 2/62 | Johnston | 343—18 |
| 3,107,617 | 10/63 | Loeper et al. | 102—92.5 X |

OTHER REFERENCES

Klass, P. J., Avionics Fights Its Own Silent War, in Aviation Week: p. 50–63, Nov. 18, 1957.

Klass, P. J., Avionic War Aims at Deceit, Confusion, in Aviation Week: p 102–109, Nov. 25, 1957.

SAMUEL FEINBERG, *Primary Examiner.*

BENJAMIN A. BORCHELT, *Examiner.*